US011971514B2

(12) United States Patent
Bardainne et al.

(10) Patent No.: US 11,971,514 B2
(45) Date of Patent: Apr. 30, 2024

(54) METHOD AND DEVICE FOR MONITORING THE SUBSOIL OF THE EARTH UNDER A TARGET ZONE

(71) Applicant: SERCEL, Carquefou (FR)

(72) Inventors: Thomas Bardainne, Paris (FR); Baptiste Rondeleux, Paris (FR)

(73) Assignee: SERCEL, Carquefou (FR)

( * ) Notice: Subject to any disclaimer, the term of this patent is extended or adjusted under 35 U.S.C. 154(b) by 583 days.

(21) Appl. No.: 17/261,933

(22) PCT Filed: Jul. 3, 2019

(86) PCT No.: PCT/FR2019/051642
§ 371 (c)(1),
(2) Date: Jan. 21, 2021

(87) PCT Pub. No.: WO2020/021177
PCT Pub. Date: Jan. 30, 2020

(65) Prior Publication Data
US 2021/0302609 A1 Sep. 30, 2021

(30) Foreign Application Priority Data
Jul. 24, 2018 (FR) ...................... 1856857

(51) Int. Cl.
G01V 1/28 (2006.01)
G01V 1/30 (2006.01)
G01V 1/36 (2006.01)
(52) U.S. Cl.
CPC .............. G01V 1/305 (2013.01); G01V 1/288 (2013.01); G01V 1/364 (2013.01); G01V 2210/123 (2013.01); G01V 2210/6161 (2013.01)

(58) Field of Classification Search
CPC ........ G01V 1/305; G01V 1/003; G01V 1/288; G01V 1/303; G01V 1/364; G01V 1/28;
(Continued)

(56) References Cited

U.S. PATENT DOCUMENTS 8,797,828 B1 *  8/2014  Lev .................. G01V 8/00
                                           356/497
2003/0025917 A1 * 2/2003  Suhami ............ G01B 9/02091
                                           356/601
(Continued)

FOREIGN PATENT DOCUMENTS

CN 106710212 A   5/2017
GB  2178172 A  *  2/1987 ............. B82Y 10/00
(Continued)

OTHER PUBLICATIONS

Shan Dou et al. "Distributed Acoustic Sensing for Seismic Monitoring of The Near Surface: A Traffic-Noise Interferometry Case Study," Scientific Reports, Sep. 14, 2017 (Sep. 14, 2017), pp. 1-12, vol. 7, No. 1 (Year: 2017).*
(Continued)

Primary Examiner — Jeffrey P Aiello
(74) Attorney, Agent, or Firm — PATENT PORTFOLIO BUILDERS PLLC

(57) ABSTRACT

In order to monitor the subsoil of the earth under a target zone, seismic waves coming from an identified mobile noise source are recorded by means of at least one pair of sensors disposed on either side of the target zone, time periods are selected corresponding to the alignments of the pairs of sensors with the noise source, a seismogram of the target zone is reconstructed by interferometry based on the recorded seismic waves and on the selected time periods and an image of the subsoil of the target zone is generated using the seismogram.

19 Claims, 3 Drawing Sheets

(58) Field of Classification Search
CPC .......... G01V 1/36; G01V 1/282; G01V 1/366;
G01V 1/20; G01V 2210/123; G01V
2210/32; G01V 2210/56; G01V
2210/3246; G01V 2210/679; G01V
2210/6163; G01V 2210/1236; G01V
2210/6161; G01V 2210/66; G01V 3/12;
G01V 3/38; G01V 11/007; G06F 17/00
USPC ...... 73/152.16, 290 R, 152.02, 1.16; 175/50;
324/334, 323, 336; 367/38, 73, 45, 14,
367/43, 21, 40, 50; 702/18, 16, 17, 14,
702/11, 2, 7, 8, 55, 5, 15, 159, 188, 70,
702/127, 170, 187, 23, 32, 33, 66; 703/2,
703/5
See application file for complete search history.

(56) References Cited

U.S. PATENT DOCUMENTS

| | | |
|---|---|---|
| 2008/0133140 A1 | 6/2008 | Ferber et al. |
| 2017/0052269 A1 | 2/2017 | Cotton et al. |

FOREIGN PATENT DOCUMENTS

| | | | |
|---|---|---|---|
| WO | WO-9926179 A1 * | 5/1999 | ............... G01V 1/36 |
| WO | 2013114128 A1 | 8/2013 | |
| WO | 2016159939 A1 | 10/2016 | |

OTHER PUBLICATIONS

Diego A. Quiros et al., "Seismic interferometry of railroad induced ground motions: body and surface wave imaging" Geophysical Journal International., GB, Feb. 19, 2016 (Feb. 19, 2016), pp. 301-313, vol. 205, No. 1 (Year: 2016).*
Nakata Nori et al., "Near-surface velocity imaging using traffic-induced high-frequency ground motion," SEG Technical Program Expanded Abstracts, Aug. 17, 2017 (Aug. 17, 2017), pp. 2940-2945 (Year: 2017).*
Office Action in corresponding/related Russian Application No. 2021100995/28 dated Aug. 8, 2022.
Office Action in corresponding/related European Application No. 19758422.0 dated Nov. 4, 2022, including partial English translation.
Diego A. Quiros et al., "Seismic interferometry of railroad induced ground motions: body and surface wave imaging" Geophysical Journal International., GB, Feb. 19, 2016 (Feb. 19, 2016), pp. 301-313, vol. 205, No. 1.
International Search Report / Written Opinion dated Nov. 5, 2019 in related/corresponding PCT Application No. PCT/FR2019/051642.
Nakata Nori et al., "Near-surface velocity imaging using traffic-induced high-frequency ground motion," SEG Technical Program Expanded Abstracts, Aug. 17, 2017 (Aug. 17, 2017), pp. 2940-2945.
Shan Dou et al. "Distributed Acoustic Sensing for Seismic Monitoring of The Near Surface: A Traffic-Noise Interferometry Case Study," Scientific Reports, Sep. 14, 2017 (Sep. 14, 2017), pp. 1-12, vol. 7, No. 1.
Examination Report in corresponding/related Australian Patent Application No. 2019311797 dated Feb. 19, 2024.

* cited by examiner

METHOD AND DEVICE FOR MONITORING THE SUBSOIL OF THE EARTH UNDER A TARGET ZONE

The present invention relates to a method and a device for monitoring the subsoil of the earth under a target zone.

It belongs to the field of seismic analysis and is notably applicable in activities for monitoring the subsoil of the earth and for detecting anomalies in the latter, such as the detection of cavities under railroad tracks, roads, buildings or airports.

In order to guarantee the safety of the users of these terrestrial infrastructures, it is indeed important to carry out an instantaneous, temporary or permanent monitoring of the subsoil, in order to detect any potential underground anomaly, such as a cavity, likely to weaken the civil engineering works constructed on the surface.

In an article entitled "Seismic interferometry of railroad induced ground motions: body and surface wave imaging", published in Geophys. 3. Int. 205, 2016, pages 301-313, Diego A. QUIROS et al. provide a method for generating virtual propagation paths along a railroad track, based on the interferometric analysis of the ambient noise, captured by a single row of seismic wave receivers or sensors deployed along this railroad track.

This method has the drawback of limiting the information obtained to the subsoil localized directly under the row of sensors and does not allow a three-dimensional image of the subsoil under the railroad track to be produced, but relates to a two-dimensional image of an underground line parallel to the railroad track.

Moreover, in this purely passive method, the noise of the trains is mixed with all the other noise sources and used when the latter are far from the receivers in order to be aligned with the row of receivers. The noise captured by the receivers is therefore weak and not very suitable for imaging.

The documents "Near-surface velocity imaging using traffic induced high-frequency ground motion", by N. NAKATA et al. (SEG 2017, p. 2940-2945) and "Distributed acoustic sensing for seismic monitoring of the near surface: a traffic-noise interferometry case study" by S. DOU et al., Scientific Reports 2017; 7:11620 describe similar approaches, with the same drawbacks of 2D imaging close to the regions to be studied.

The aim of the present invention is to overcome the drawbacks of the prior art.

For this purpose, the present invention provides a method for monitoring the subsoil of the earth under a target zone as claimed in claim 1.

In particular, seismic wave sensors are disposed on either side of the target zone, and an identified source of seismic noise is in motion, preferably outside of the target zone and even outside of the space defined by the sensors. The method comprises the recording, over given periods, of the waves coming from the source by pairs of sensors, the periods being chosen so that the source and the pairs of sensors are aligned, the target zone being localized between the sensors of the pairs in question, then the reconstruction by interferometry of a seismogram based on these recordings. The seismogram then generates an image of the subsoil under the target zone.

Thus, using, on the one hand, a mobile source of seismic noise whose characteristics are known by virtue of the analysis of the signal itself and do not require any a priori information and, on the other hand, at least two sensors which, for a certain period of time, are going to be aligned with this noise source, allows a passive monitoring in space and time, in other words in four dimensions, with a high amplitude and a high resolution, of the part of the subsoil situated under the surface where the sensors are disposed, as long as the mobile noise source is aligned with the pair of sensors at at least one given moment in time.

Thus, if a pair of sensors is disposed on either side of a target zone (for example of a railroad track), it is possible of generate an image of the subsoil under this target zone if a mobile source (for example a train on another track) passes close by and is aligned at least at one moment in time with the pair of sensors. The multiplication of the sensors around the target zone, for example by positioning them in a parallel manner on each side of a railroad track, or even on each of the rails of a railroad track, allows the three-dimensional image of the target zone to be generated by virtue of the movement of the source.

In one particular embodiment, the method furthermore comprises, prior to the reconstruction step, a step for pre-processing the recorded seismic waves.

This allows signals of optimal quality to be obtained, which enhances the reliability of the image of the subsoil obtained.

Advantageously, the pre-processing step comprises denoising and frequency filtering operations.

Optionally, the pre-processing step may comprise a spectral whitening and/or a binarization operation.

This type of operation allows the later processing operations for reconstruction of the seismogram to be simplified.

In one particular embodiment, during the step for reconstruction by interferometry, at least one operation is carried out for intercorrelation of signals coming from the seismic waves respectively recorded by the two sensors of the pair of sensors.

This allows the seismogram to be reconstructed efficiently.

In one particular embodiment, the recording step is carried out continuously over time.

This allows states of the subsoil to be produced with a chosen periodicity, for example daily or weekly or monthly.

In one particular embodiment, following the reconstruction step, the method furthermore comprises a step for addition of reconstructed signals of the seismogram coming from several mobile noise sources respectively aligned with the pair of sensors during separate periods of time.

This addition step allows the quality and the reliability of the reconstruction to be reinforced.

In one particular embodiment, during the recording step, seismic surface waves are recorded.

In this embodiment, during the step for generating the image:

dispersion curves of the surface waves in the reconstructed signals of the seismogram are determined within a predetermined band of frequencies;

a tomography of the speed of the reconstructed signals is carried out based on the dispersion curves; and an inversion of the surface wave speeds of the reconstructed signals is carried out, so as to produce a speed model of P- and S-waves.

As a variant, during the recording step, refracted seismic waves may be recorded.

In this variant, during the step for generation of the image:

the times of arrival of the reconstructed signals of the seismogram corresponding to the refracted seismic waves are determined; and a tomography of the reconstructed signals corresponding to the refracted P-waves is carried out based on the aforementioned times of arrival, so as to produce a speed model of P-waves.

According to particular possible features, reflected seismic waves may be recorded, the sensors may comprise at least one geophone and/or at least one accelerometer and/or at least one sensor based on the use of optical fibers, for example of the DAS (Distributed Acoustic Sensing) type, and the sensors may be placed according to at least two rows, or on square or hexagonal grids, and/or may be regularly spaced.

The aforementioned target zone may be a railroad track or a road or another civil engineering work, or a building.

The target zone may be a first railroad track and the source may be a train traveling on a second railroad track substantially parallel to the first railroad track. The sensors may be disposed in a regularly spaced manner in two parallel rows surrounding the first railroad track.

With the same aim as that indicated hereinabove, the present invention also provides a device for monitoring the subsoil of the earth under a target zone, which is noteworthy in that it comprises elements designed to implement steps of a method such as succinctly described hereinabove.

Since the particular features and the advantages of the device are similar to those of the method, they are not repeated here.

Other aspects and advantages of the invention will become apparent upon reading the detailed description hereinafter of particular embodiments, given by way of non-limiting examples, with reference to the appended drawings, in which.

Figure 1:
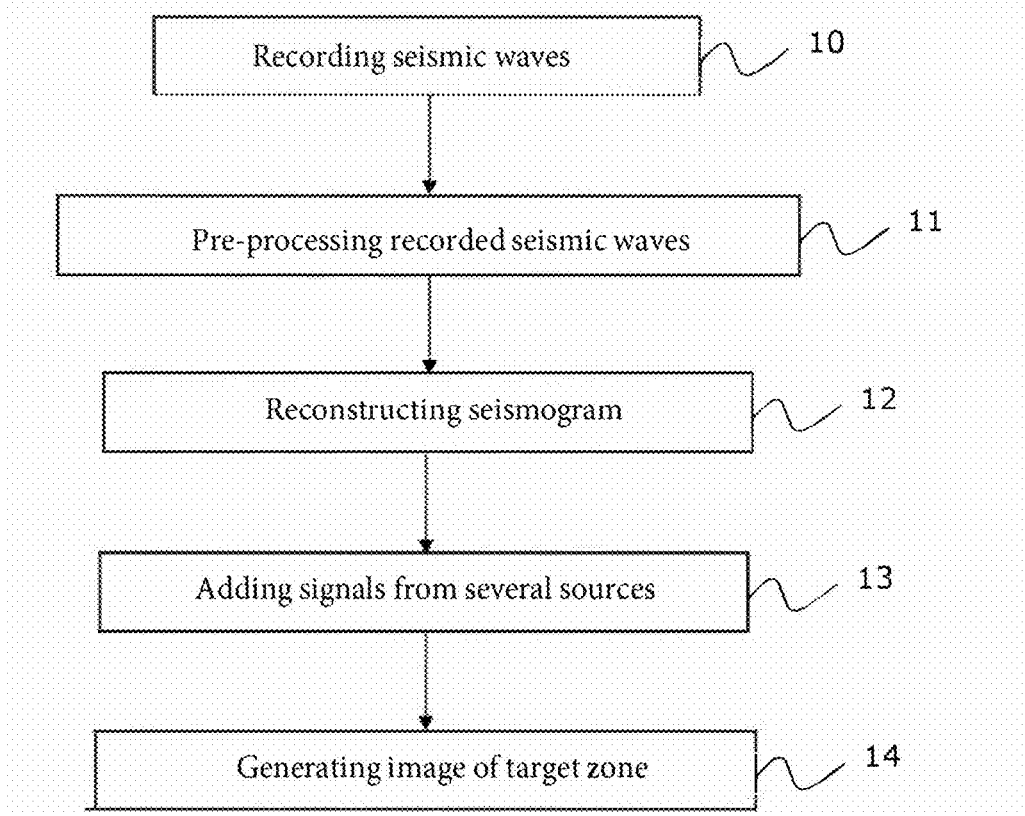
FIG. 1 is a flow diagram illustrating steps of a method for monitoring the subsoil of the earth under a target zone according to the present invention, in one particular embodiment.

As shown by the flow diagram in FIG. 1, during a first step 10 of the method for monitoring the subsoil of the earth under a target zone according to the invention, seismic waves are recorded for at least a predetermined period of time.

These seismic waves originate from a mobile source of seismic noise, in other words a moving source whose motion produces noise. This noise source is known in the sense that it is well identified. This is not therefore an ambient noise of unidentified origin.

The recording of these seismic waves is carried out by means of at least one pair of sensors disposed in such a manner as to be aligned with the noise source during the aforementioned period of time.

Figure 2:
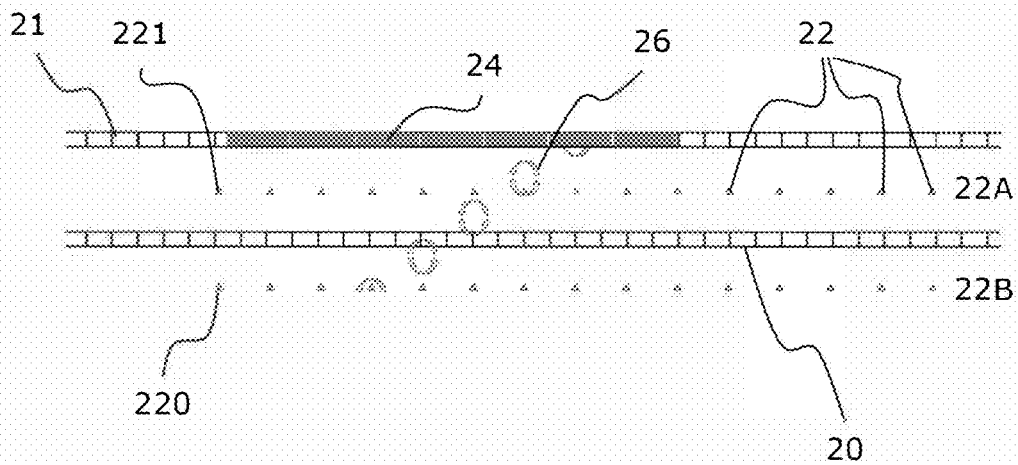
FIG. 2 is a schematic view illustrating a configuration for recording seismic waves in one non-limiting example where the target zone is a railroad track.

The pairs of sensors may be disposed according to various arrangements, such as for example regularly spaced along straight lines or rows as shown in FIG. 2 described hereinafter, but they may also be spaced in an irregular fashion, following all kinds of curves, or on regular or irregular grids of square or hexagonal or any given shape. They may also be placed randomly.

FIG. 2 gives, by way of non-limiting example, a recording configuration in the case where the target zone is a railroad track 20. Nevertheless, the invention is just as applicable to a target zone consisting of a road, or else a building or another item of infrastructure, such as for example an airport.

A plurality of receivers or seismic wave sensors 22 is deployed along the railroad track 20, referred to as target track, on either side of the latter. These sensors 22 are distributed between a "Receiver row A" 22A and a "Receiver row B" 22B. The sensors 22 may for example comprise at least one geophone and/or at least one accelerometer and/or at least one sensor based on the use of optical fibers, for example of the DAS (Distributed Acoustic Sensing) type.

On either side of the target railroad track 20, the sensors 22 may for example be disposed at regular intervals from one another, for example at a few meters' interval, leaving for example 2 meters between each sensor 22.

The sensors 22 may be placed on the surface of the ground or be slightly buried, in other words situated a few meters under the surface of the ground. They may be deployed on or under the ballast, or else on or under the rails or else in a railroad tunnel.

The plurality of sensors 22 comprises at least one pair of sensors 220, 221 disposed opposite each other, on either side of the railroad track 20, in a transverse manner to the latter.

The mobile seismic noise source is a train 24 travelling on a railroad track 21, referred to as source track, distinct from the target railroad track 20. The noise emitted by the moving train 24 is symbolized in the drawing by arrows in the form of circles 26. This noise mainly comes from the contact of the wheels of the train 24 on the rails of the railroad track 21.

The assembly comprising the plurality of sensors 22, the mobile source 24 of seismic noise and a module designed to carry out the processing operations of the method for monitoring the subsoil described here, forms a device for monitoring the subsoil according to the invention.

Considering the pair of sensors 220, 221, this will be located in the alignment of the train 24 for a predetermined period of time defined by a first moment in time where the point of contact of the first wheel of the train 24 with the rail is on the straight line passing through the barycenter of the sensors 220 and 221 and a second moment in time where the point of contact of the last wheel of the train 24 with the rail is on the straight line passing through the barycenter of the sensors 220 and 221.

According to the invention, during this period of time, the sensors 220 and 221 record seismic waves which will undergo later processing operations of the method according to the invention. This period of time is predetermined, given that the kinematic parameters of the train 24 are known, namely, its position and its speed at all times. In this sense, the mobile seismic noise source constituted by the train 24 is identified.

The recording step 10 may be limited to this predetermined period of time. As a variant, the recording may take place continuously over time.

With reference to the flow diagram in FIG. 1, optionally, the step 10 for recording seismic waves may be followed by a step 11 for pre-processing the seismic waves recorded by the sensors 22.

These pre-processing operations may be of various types and include at least one denoising phase and one frequency filtering phase.

In the non-limiting example of a railroad track described here, during the phase for denoising the recorded seismic waves, the main noise surrounding the seismic noise produced by the train 24 is removed. This main surrounding noise is an electrical noise associated with the overhead catenary cables whose characteristics are known. A signal with an improved signal-to-noise ratio is thus obtained.

During the frequency filtering phase, the signal is filtered within a predetermined band of frequencies which corresponds to both the estimated emission band of the train 24 and to the frequency band of interest, which depends on the depth of interest of the investigation of the subsoil under the target zone constituted by the railroad track 20.

Furthermore, between the denoising phase and the frequency filtering phase, optionally, a spectral whitening operation and/or a binarization operation may furthermore be performed.

The spectral whitening operation, also referred to as spectral equalization, a technique known per se, consists in weighting all the frequency components of the signal in such a manner that they all have the same representation in energy.

The binarization operation, also known per se, consists in assigning a value of −1 or +1 to each instantaneous value of the signal in order to simplify the signal.

Other types of pre-processing operations may be applied.

Following the recording step 10 and, potentially, the step 11 for pre-processing of the seismic waves recorded by the sensors 22, a step 12 for reconstructing a seismogram of the target zone is carried out.

This reconstruction step 12 uses the seismic waves, recorded and potentially pre-processed, and applies an interferometry technique to them.

This interferometry technique comprises, for example, at least one operation for intercorrelation of signals coming from the seismic waves respectively recorded by the sensors 220 and 221 during the predetermined period of time when the train 24 passes over the source track 21. This interferometry technique allows virtual transverse propagation paths to be reconstructed, here perpendicular to the target railroad track 20. These virtual propagation paths characterize the seismogram.

Figure 3:
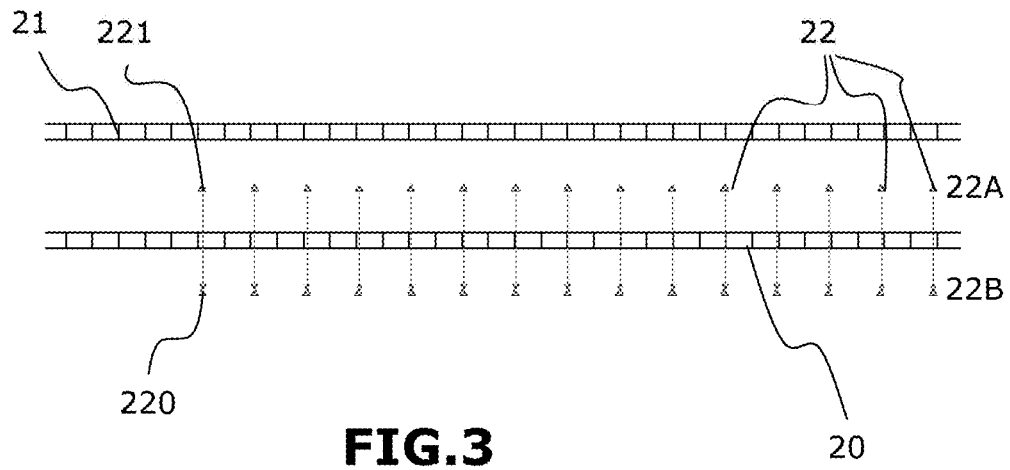
FIG. 3 is a schematic view illustrating a configuration for reconstruction of virtual propagation paths in the example in FIG. 2.

FIG. 3 illustrates schematically these virtual propagation paths for each pair of sensors opposite each other on either side of the target railroad track 20.

As a variant, any other interferometry technique could be applied during this reconstruction step 12, such as for example a method based on convolution operations instead and in place of the aforementioned intercorrelation operations.

Figure 4:
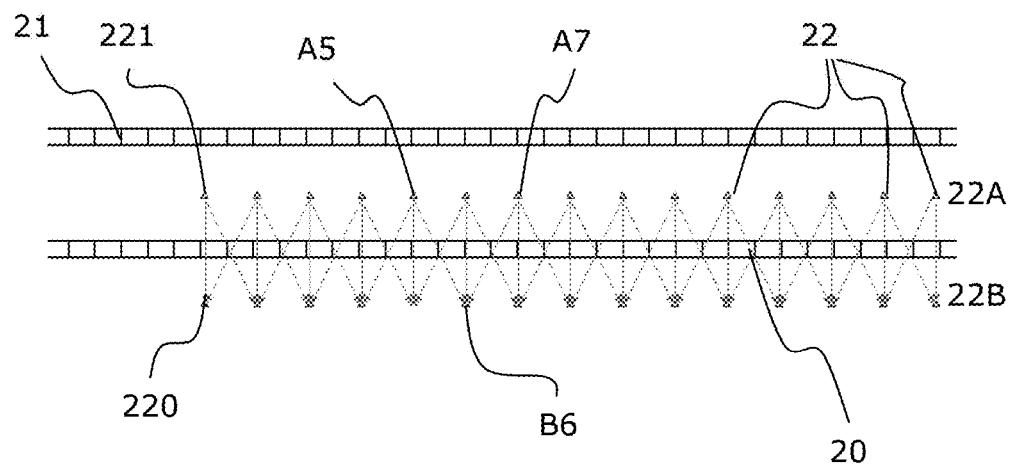
FIG. 4 is a schematic view illustrating a configuration for reconstruction of virtual propagation paths along several orientation directions, in the example in FIG. 2.

As illustrated by FIG. 4, the reconstruction step 12 may be carried out for various orientation directions. Indeed, intercorrelation operations may be carried out, not only between the signals coming from the seismic waves recorded by the pairs of sensors situated opposite each other like the pair of sensors 220 and 221, but also between the pairs of sensors disposed in a similar manner to the sensors A5 and B6 or to the sensors A7 and B6, in other words the pairs of sensors for which the straight line passing through the barycenters of the two sensors of the pair forms a non-zero angle with the perpendicular to the target railroad track 20.

Figure 5:
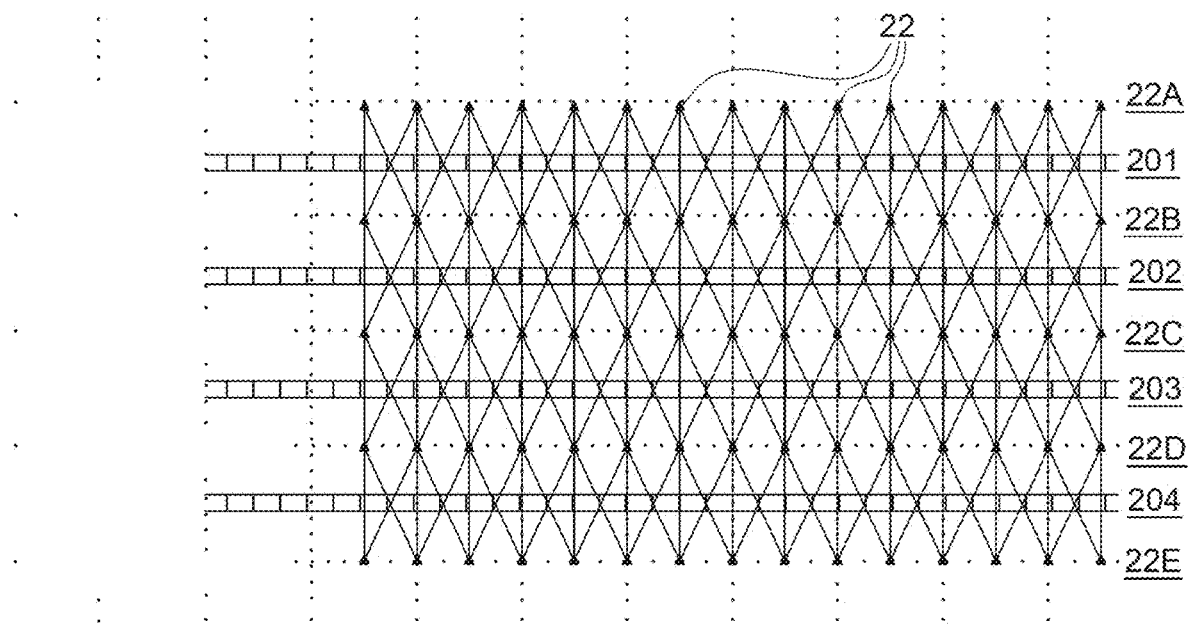
FIG. 5 is a schematic view illustrating a configuration for reconstruction of virtual propagation paths along several orientation directions and using several railroad tracks.

Furthermore, as illustrated in FIG. 5, the reconstruction step 12 may be carried out, not only for various orientation directions but furthermore by using several railroad tracks associated with pairs of sensors. The source track 21, parallel to the tracks 201 to 204, is situated opposite the "receiver row 22A", as in FIGS. 2 to 4 but, for simplification, is not shown in FIG. 5.

Thus, when a train passes over the source track 21, virtual propagation paths between the rows 22A and 22B and/or between the rows 22B and 22C and/or between the rows 22C and 22D and/or between the rows 22D and 22E may be reconstructed by interferometry. In other words, for each pair of adjacent railroad tracks, each railroad track allows a reconstruction of a seismogram of the zone situated under the adjacent railroad track, using the pairs of sensors deployed on either side of this adjacent railroad track.

The reconstruction of transverse virtual propagation paths, in other words transverse to the railroad track, has been described hereinabove using the time window in which the train 24 is aligned with a pair of sensors of the type of the pair 220, 221: the pairs of sensors allow the variation of the seismic noise path to be studied.

As a variant, it is possible to use the correlation, by convolution, between two sensors on either side of a track and the signal emitted by a train on this same track. Thus, the time variations of the propagation times may be used as a continuous monitoring for the purpose of measuring any appearance of anomalies.

With reference to FIG. 1, following the reconstruction step 12, optionally, a step 13 may be carried out for addition, or "stacking", of reconstructed signals coming from sensed seismic waves originating from several mobile sources 24 of seismic noise.

In the non-limiting example described here where these noise sources are trains, several trains travelling at different times, having different lengths and speeds, which will therefore be aligned with a pair of sensors of the type of the pair 220, 221 during different periods of time, will supply similar reconstructed signals.

The addition of these multiple signals allows the signal-to-noise ratio to be improved and hence, in the end, an image of better quality of the subsoil under the target zone to be obtained. Furthermore, for a given pair of sensors of the type of the pair 220, 221, this allows virtual propagation paths to be produced as a one-off or periodically with a chosen periodicity, namely, daily or weekly or else monthly, for example.

As shown in FIG. 1, following the reconstruction step 12 and the potential stacking step 13, a step 14 for generating an image of the subsoil under the target zone is carried out, using the previously reconstructed seismogram.

During this step 14 for generating an image, the processing operations will differ depending on the type of seismic waves recorded at the step 10. This is because either surface waves, or refracted waves, or potentially reflected waves, may be recorded.

In one embodiment where, at the step 10, seismic surface waves are recorded, the following operations are carried out in order to obtain an image of the subsoil under the target zone.

First of all, dispersion curves of the surface waves are determined in the reconstructed signals, within a predetermined band of frequencies. By way of non-limiting example, this band of frequencies may be the band from 1 to 100 Hz.

Optionally, only the maxima of these dispersion curves may subsequently be selected.

Then, using these dispersion curves, a tomography of the speed of the reconstructed signals is carried out.

Lastly, an inversion of the surface wave speeds of the reconstructed signals coming from the surface waves is carried out, so as to produce a speed model of the pressure and shear waves, known to those skilled in the art by the terminology P- and S-waves.

By virtue of the repetition of these operations over time, an image of the subsoil under the target zone is thus obtained which evolves over time, in other words, a representation in four dimensions of this region of the subsoil.

In another embodiment, where, at the step 10, refracted seismic waves are recorded, the following operations are carried out in order to obtain an image of the subsoil under the target zone.

First of all, the arrival times are determined of the reconstructed signals of the seismogram, corresponding to the refracted seismic waves.

Then, a tomography of the reconstructed signals corresponding to the refracted P-waves is carried out based on these arrival times, so as to produce a speed model of the pressure waves, known as P-waves.

In a similar manner to the embodiment where seismic surface waves are recorded, by virtue of the repetition of these operations over time, an image of the subsoil under the target zone is thus obtained which evolves over time, in other words, a representation in four dimensions of this region of the subsoil.

In yet another particular embodiment, reflected seismic waves could be recorded at the step 10. This would then lead to an image of the reflectivity of the subsoil under the target zone being obtained.

It is possible to naturally cumulate the recordings of the refracted waves with the surface waves, which accordingly increases the resolution, just as does the integration of the processing of the reflected waves into the preceding methods. In particular, the signals are processed independently up to the centers, which are subsequently combined, the centers being the dispersion curves for the surface waves and the time of first arrival for the refracted waves.

Figure 6:
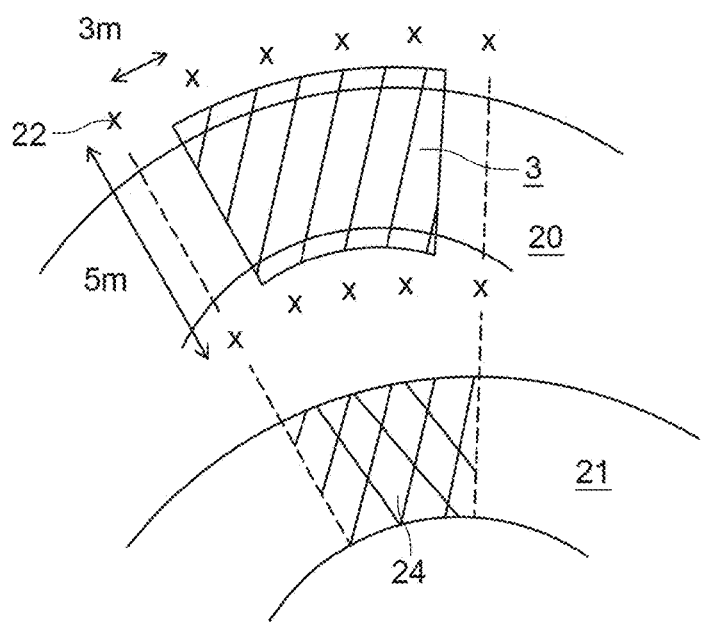
FIG. 6 is a schematic view of a preferred embodiment of the invention.

In particular, preferably and such as illustrated in FIG. 6, the image of the target subsoil 3 under a railroad track 20, of width of the order of 1.5 m, spaced from a parallel source track 21, may be formed by two rows of sensors of the conventional accelerometer type spaced by 5 m flanking the railroad track 20, the sensors 22 of each row being separated by 3 m, the sensors being disposed in a staggered manner in order to homogenize the resolution of the three-dimensional image obtained by intercorrelation so as to cover the whole track. The processing of the refracted surface waves allows a resolution of 2 m, or even less, to be attained. If a higher resolution is required, the rows of sensors may be brought closer together, for example by directly associating the sensors with the rails of the track, in other words by spacing them out by the order of 1.5 m, and/or by using two optical fibers for DAS, thus creating sensors spaced out by the order of 60 cm.

It is of course possible to add to the method according to the invention a reconstruction similar to those described in the prior art, in which groups of sensors allow the dispersion curves of the seismic waves to be analyzed, and the resolution and/or the reliability of the image to be further enhanced: virtual longitudinal propagation paths, in other words parallel to the railroad track, are thus reconstructed for example by using time windows of predetermined duration preceding and following the passage of the train 24, respectively after the sensors begin to receive seismic waves and before the sensors stop receiving seismic waves.

The method according to the invention comprises a passive monitoring of the subsoil under a target zone in the sense that it processes seismic waves received, but does not produce any. Nevertheless, it may be envisioned to combine the sensors that receive the seismic waves with active seismic sources, in order to apply processing operations of the type described in the document US-A-2017 052269.

The invention claimed is:

1. A method for monitoring the subsoil of the earth under a target zone, the method comprising:
    recording for a period of time, with a pair of sensors, which are located on opposite sides of the target zone, seismic waves coming from an identified and mobile source of seismic noise, wherein the period of time is defined by a first moment in time, when a first point of contact between the source and the earth is on a straight line passing through a barycenter of the pair of sensors, and a second moment in time, when a last point of contact between the source and the earth is on the straight line;
    reconstructing a seismogram of the target zone by interferometry based on said recorded seismic waves and the period of time; and
    generating an image of the subsoil under the target zone using the seismogram for detecting an underground anomaly.

2. The method as claimed in claim 1, wherein the source is moving outside of a segment formed by the disposition of the pair of sensors.

3. The method as claimed in claim 1, further comprising, prior to the reconstruction step, pre-processing the recorded seismic waves.

4. The method as claimed in claim 3, wherein the pre-processing step comprises denoising and frequency filtering operations.

5. The method as claimed in claim 3, wherein the pre-processing step comprises a spectral whitening operation.

6. The method as claimed in claim 1, wherein during the step for reconstruction by interferometry, at least one operation is carried out for intercorrelation of signals coming from the seismic waves respectively recorded by two sensors of the pair of sensors.

7. The method as claimed in claim 1, wherein the recording step is carried out continuously over time.

8. The method as claimed in claim 1, further comprising, following the reconstruction step, a step for addition of reconstructed signals the seismogram coming from several mobile noise sources respectively aligned with the pair of sensors during separate periods of time.

9. The method as claimed in claim 1, wherein during the recording step, seismic surface waves are recorded.

10. The method as claimed in claim 9, wherein the step for generating the image comprises:
    determining dispersion curves of the surface waves in the reconstructed signals of the seismogram within a predetermined band of frequencies;
    carrying out a tomography of a speed of said reconstructed signals based on the dispersion curves; and
    carrying out an inversion of the surface wave speeds of the reconstructed signals to produce a speed model of P- and S-waves.

11. The method as claimed in claim 1, wherein, during the recording step, refracted seismic waves are recorded.

12. The method as claimed in claim 11, wherein the step for generating the image comprises:

determining the time of arrival of the reconstructed signals of the seismogram corresponding to the refracted seismic waves; and performing a tomography of the reconstructed signals corresponding to the refracted P-waves based on the time of arrival, so as to produce a speed model of P-waves.

13. The method as claimed in claim 1, wherein during the recording step, reflected seismic waves are recorded.

14. The method as claimed in claim 1, wherein the pair of sensors comprise at least one geophone and/or at least one accelerometer and/or at least one optical fibers.

15. The method as claimed in claim 1, wherein the pair of sensors is placed along two rows, or on square or hexagonal grids, and/or are regularly spaced.

16. The method as claimed in claim 1, wherein the target zone is a railroad track or a road or a building.

17. The method as claimed in claim 1, wherein the target zone is a first railroad track and the source is a train travelling over a second railroad track substantially parallel to the first railroad track.

18. The method as claimed in claim 17, wherein the pair of sensors is disposed in a regularly spaced fashion in two parallel rows surrounding the first railroad track.

19. A device for monitoring the subsoil of the earth under a target zone, the device comprising:

a pair of sensors located on opposite sides of the target zone, the pair of sensors being configured to record, for a period of time, seismic waves coming from an identified and mobile source of seismic noise, wherein the period of time is defined by a first moment in time, when a first point of contact between the source and the earth is on a straight line passing through a barycenter of the pair of sensors, and a second moment in time, when a last point of contact between the source and the earth is on the straight line; and a module configured to reconstruct a seismogram of the target zone by interferometry based on the recorded seismic waves and the period of time, and to generate an image of the subsoil under the target zone using the seismogram for detecting an underground anomaly.

* * * * *